United States Patent [19]
Moulder

[11] Patent Number: 5,725,004
[45] Date of Patent: Mar. 10, 1998

[54] SUPPORTED CANOPY

[76] Inventor: Peter V. Moulder, 2734 St. Charles Ave., New Orleans, La. 70130

[21] Appl. No.: 649,904

[22] Filed: May 15, 1996

[51] Int. Cl.$^6$ .................................................. A45B 19/02
[52] U.S. Cl. ........................ 135/20.2; 135/98; 135/15.1; 135/33.2
[58] Field of Search ..................... 135/98, 15.1, 20.2, 135/33.2

[56] References Cited

U.S. PATENT DOCUMENTS

| | | |
|---|---|---|
| 269,317 | 12/1882 | Peace . |
| 1,397,789 | 11/1921 | Stonestreet . |
| 1,411,560 | 4/1922 | Beaty . |
| 2,753,878 | 7/1956 | Halberstam . |
| 3,361,145 | 1/1968 | Jones . |
| 3,954,117 | 5/1976 | Wallace .................................. 135/20.2 |
| 4,068,675 | 1/1978 | Pappanikolaov ...................... 135/20.2 |
| 4,370,994 | 2/1983 | Pittman ................................. 135/20.2 |
| 4,643,210 | 2/1987 | Feld ....................................... 135/20.2 |
| 4,747,422 | 5/1988 | Chung ................................... 135/20.2 |
| 4,766,920 | 8/1988 | Grady, II ................................ 135/20.2 |
| 4,870,983 | 10/1989 | Wang ..................................... 135/20.2 |
| 5,143,107 | 9/1992 | Kelley . |

FOREIGN PATENT DOCUMENTS

| | | |
|---|---|---|
| 1109765 | 9/1981 | Canada .................................... 135/20.2 |
| 0499870 | 1/1939 | United Kingdom ................... 135/20.2 |

OTHER PUBLICATIONS

Tim Studt, Senior Editor, R & D Magazine, Apr. 1992, pp. 55, 56, 58, 60 Smart Materials: Creating Systems That React.

Olympic Medical, four page brochure, Jul. 1, 1993, Olympic VAC–PAC.

*Primary Examiner*—Wynn E. Wood
*Attorney, Agent, or Firm*—Wood, Phillips, VanSanten, Clark & Mortimer

[57] ABSTRACT

The present invention provides a canopy operator for a supported canopy structure of the type having a support structure and an openable canopy attached to the support structure. The canopy operator comprises a conduit and a plurality of support ribs extending from the conduit to support the canopy. The support ribs comprise stiffenable tubes in communication with the conduit, the conduit and stiffenable tubes comprising a conduit system. A supply of non-gaseous material is in the conduit system, and the canopy operator also includes a pump for changing the pressure in the conduit system. The pump may be used to open the canopy by creating a vacuum in one embodiment or by pumping hydraulic fluid into the system in another embodiment. Support rods may extend alongside the stiffenable tubes. The support structure may be a central pole, as in a typical umbrella, or may be a structure such as a solid wall, edge or frame.

28 Claims, 4 Drawing Sheets

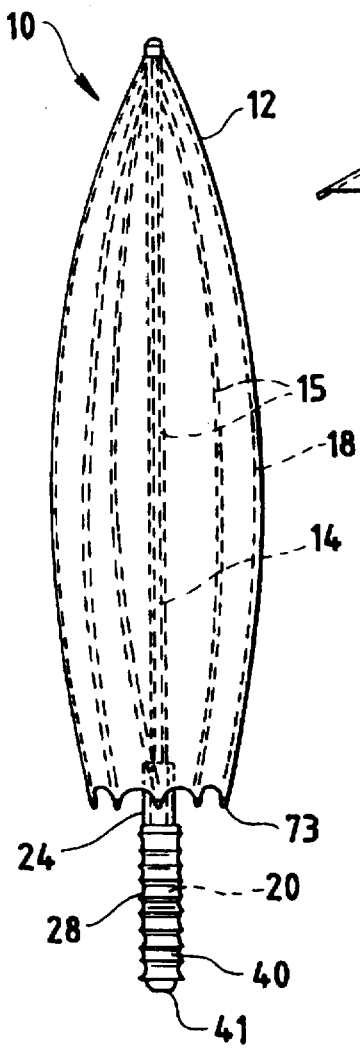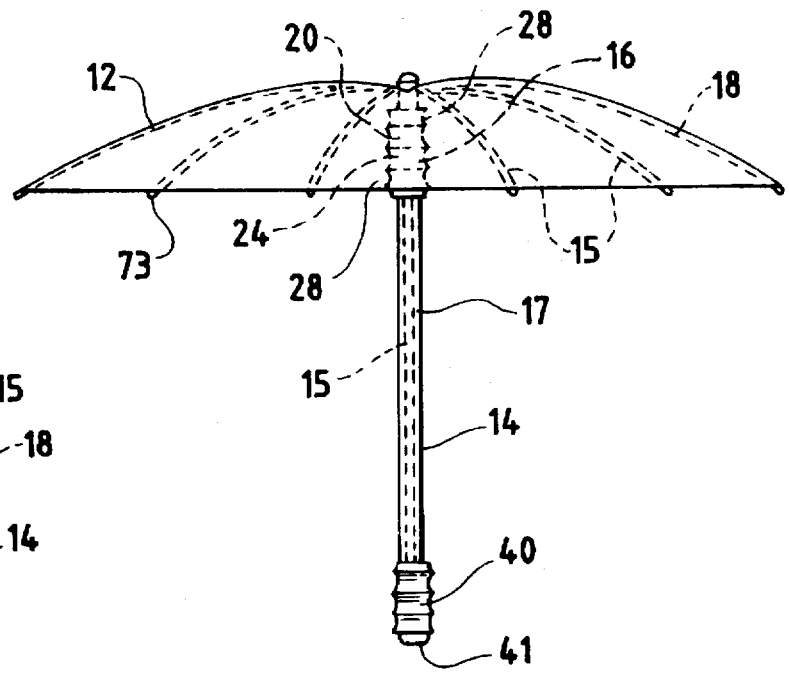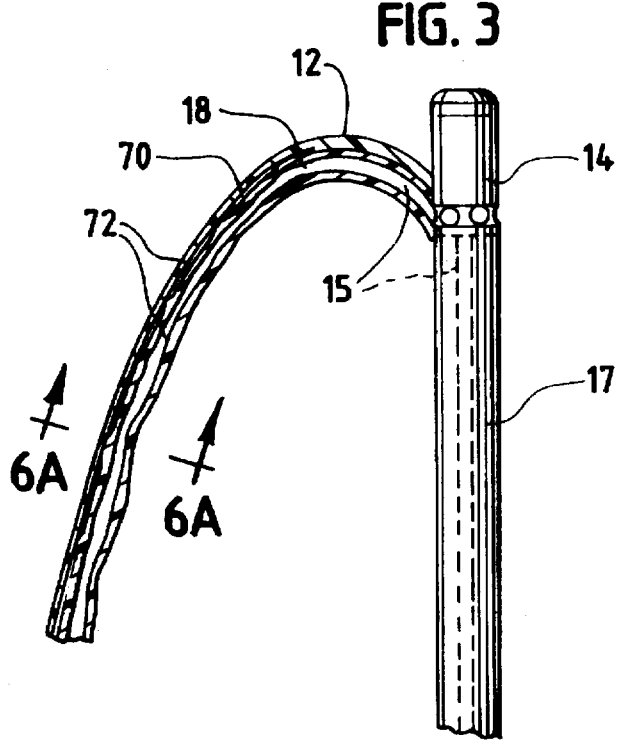

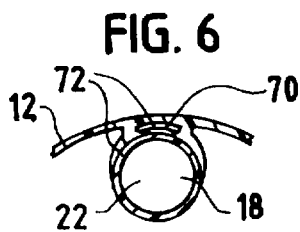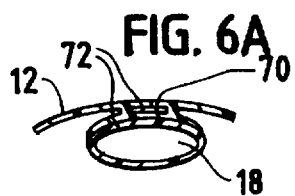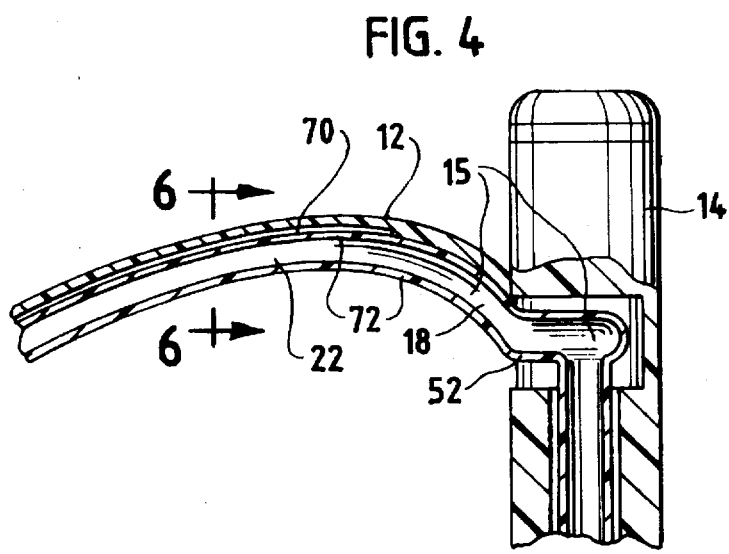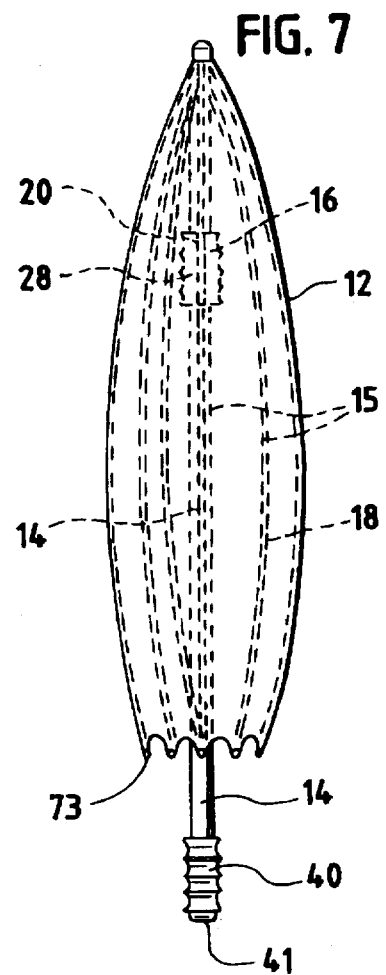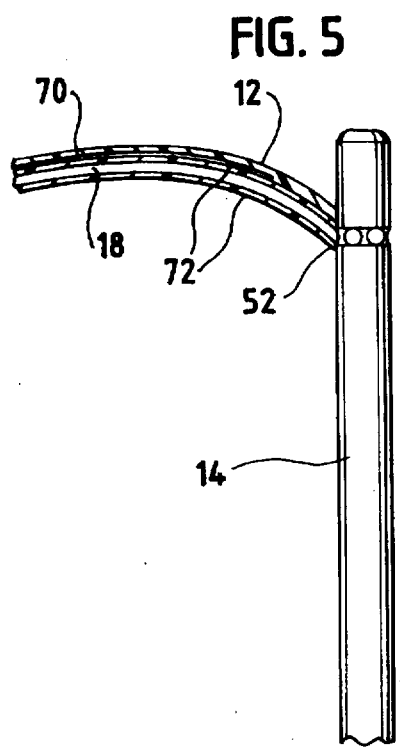

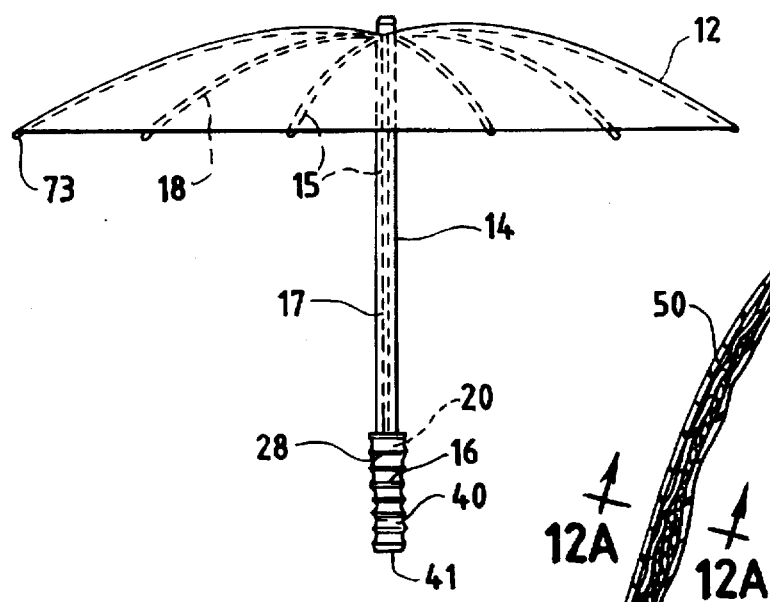
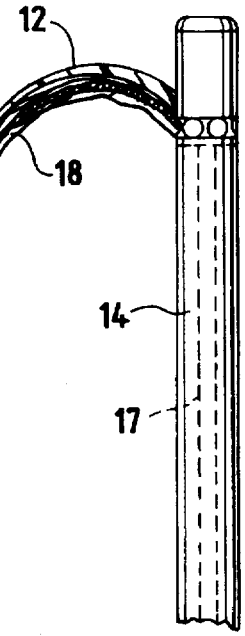
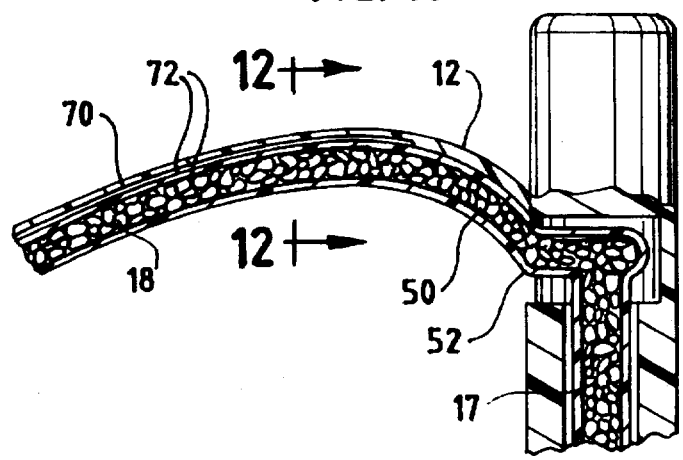
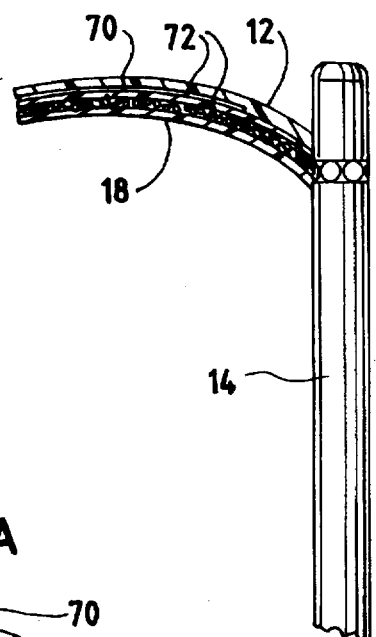
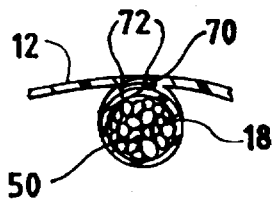
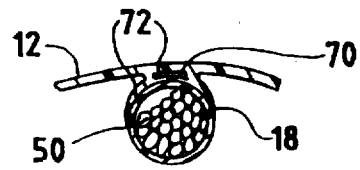

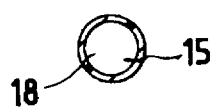
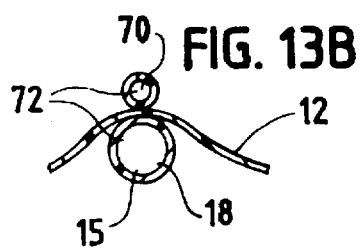
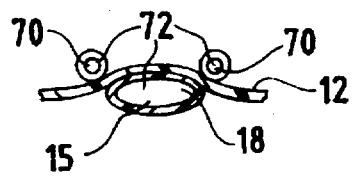
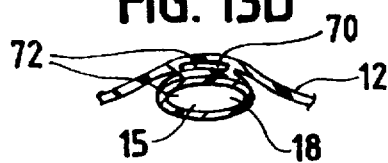
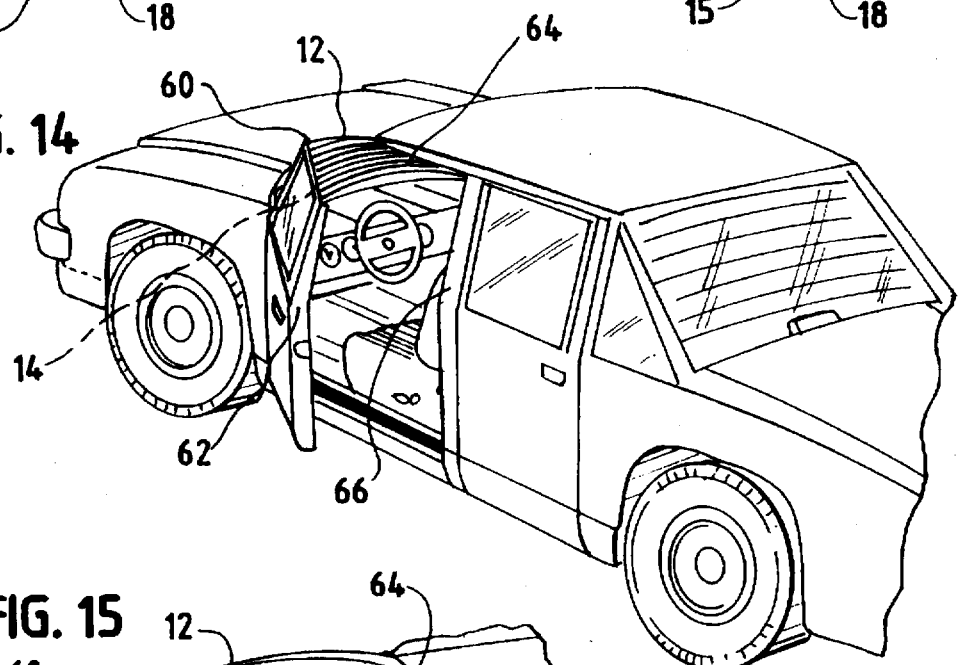
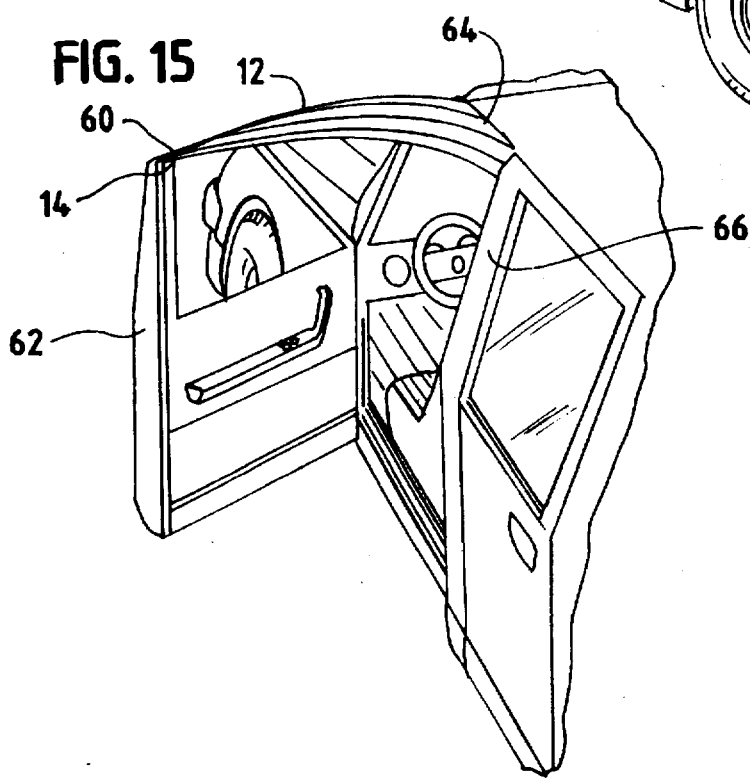

SUPPORTED CANOPY

BACKGROUND OF THE INVENTION

1. Field of the Invention

The present invention relates to supported canopies, and more particularly, to umbrellas.

2. Description of the Prior Art

Umbrellas are well known, and typically provide a waterproof canopy with a mechanical structure that will support the canopy in the open and closed positions. Typically, such umbrellas employ a system of rigid ribs depending from a hinged connection about a center pole, the ribs being pivotable between positions where the canopy is open and closed. The rigid ribs frequently have hinged supports connected to an annular slide on the umbrella's center support pole, the hinged supports holding the ribs in the expanded position when desired. The presently available umbrellas have proved to be fragile, particularly under windy conditions, and replacement after limited use is common.

Some have suggested alternatives to the typical mechanical support structure. For example, air inflated umbrellas have been suggested. However, not all have been reusable, and those that have been reusable have not all have been efficiently and easily inflated and deflated to open and close the umbrella. Nor have the prior inflatable umbrellas provided an adequately strong open canopy, and have not provided an adequate support structure for non-traditionally shaped canopies. Moreover, these prior air inflated umbrellas have not enjoyed widespread acceptance or commercial use.

SUMMARY OF THE INVENTION

The present invention provides a support structure that may not only be useful with a conventional hemispherical-shaped umbrella canopy, but that may also be used with other styles and shapes of protective canopies.

The present invention provides a canopy that can be supported to depend from a variety of support structures.

The present invention provides a canopy that can be supported to depend from a rigid central pole.

The present invention provides a canopy that can be supported to depend from a wall or edge of a support structure, such as an automobile body or door.

The present invention provides an umbrella that is reusable and efficiently and easily opened and closed.

The present invention provides an umbrella that is strong and easily opened and closed and resistant to damage from strong winds.

The present invention provides a canopy that can be designed to be operable by means of a manual piston or syringe or by using a motor assisted piston.

The present invention provides a canopy that can be designed to be operable by means of a replaceable canister of compressed air.

The present invention provides a canopy that can be designed to be operable by means of a vacuum.

In one aspect, the present invention provides, in a supported canopy structure of the type having a support structure and an openable canopy attached to the support structure, a canopy operator comprising a conduit system including a plurality of stiffenable tubes extending along the portion of the openable canopy to be supported. A quantity of non-gaseous material is in the conduit system. The operator also includes means for changing the pressure in the conduit system to cause said stiffenable tubes to stiffen and relax. The pressure changing means is on said support structure and in communication with the conduit. The stiffenable tubes are capable of stiffening with a change of pressure in the conduit system to open the canopy. The system is a closed one, so that the non-gaseous material is not lost when the canopy is closed; thus, the canopy may be reopened when desired.

In another aspect, the present invention provides a supported canopy structure comprising a support structure and an openable canopy attached to the support structure. A conduit is associated with the support structure. A conduit system is associated with said openable canopy to support the openable canopy. The conduit system includes a plurality of stiffenable tubes extending along the openable canopy. A supply of hydraulic fluid is in the conduit system. The structure also includes means for changing the pressure in the conduit system. The pressure changing means is on said support structure and in fluid communication with the conduit system. The stiffenable tubes stiffen with an increase in pressure in the conduit system to open the openable canopy.

In another aspect, the present invention provides a supported canopy structure comprising a support structure and an openable canopy attached to the support structure. A conduit system is associated with said canopy to support said canopy. The conduit system comprises a plurality of stiffenable tubes extending along the openable canopy. A supply of cluster solids is in the conduit system. The structure also includes means for changing the pressure in the conduit system, said pressure changing means being on said support structure and in communication with the conduit system. The stiffenable tubes stiffen with a decrease in pressure in the conduit system to open the openable canopy.

In another aspect the present invention provides a supported canopy structure comprising a support structure and an open canopy attached to the support structure. A plurality of stiff substantially non-gaseous support members extend along the open canopy. The stiff support members are capable of exhibiting decreased stiffnesses under different physical conditions. The invention also includes means for changing the physical conditions to which the support members are exposed to selectively decrease the stiffness of the support members. The changing means is mounted on the support structure.

In another aspect, the present invention provides a supported canopy structure comprising an openable canopy. A plurality of stiffenable members extend along portions of the openable canopy. The stiffenable members exhibit different stiffnesses under different physical conditions. A plurality of support rods extend along portions of the openable canopy. The structure also includes means for changing the physical conditions to which the stiffenable tubes are exposed to selectively change the stiffness of the stiffenable members.

The invention, in each of its aspects, may be embodied in many different structures. The tubes may be filled with liquid, such as hydraulic fluid, with the pressure changing means comprising a pump for moving the fluid into and out of the tubes. The tubes may be filled with small cluster fragments or particles, with the pressure changing means moving air into and out of the tubes. The support ribs may or may not include support rods, and the canopy may be attached to a central pole, as in traditional umbrellas, or it may be attached to a structure such as an automobile body to protect a person getting into and out of the automobile.

In one embodiment, the present invention provides an umbrella comprising a pole having upper and lower ends, an openable canopy attached to the pole, a conduit within the pole and having upper and lower ends, and a plurality of support ribs extending from the pole to support the canopy. The support ribs comprise stiffenable tubes in communication with the conduit, the conduit and stiffenable tubes comprising a conduit system. A supply of hydraulic fluid is in the conduit system, and means for changing the pressure in the conduit system are provided. The pressure changing means are on said pole and in communication with the conduit. The stiffenable tubes are capable of stiffening with an increase in pressure in the conduit system to open the canopy.

This embodiment of the present invention provides an umbrella that can be designed to be operable by pressurizing a non-compressible fluid to stiffen a plurality of stiffenable tubes. Since a non-compressible fluid, such as hydraulic fluid, is used, small diameter conduits can be used so the umbrella may maintain a compact appearance and be easily used. A syringe or hydraulic pump apparatus may be employed, using a small quantity of fluid to stiffen the tubes to open the umbrella. The syringe or hydraulic pump may be manually operated or driven by a motor. When used with an umbrella that has a central support pole, the pump or syringe may be operated by sliding a collar up and down the pole. Using such a combination, the system may be a closed one, with no valves needed for release of pressure to close the umbrella.

In another embodiment, the present invention provides an umbrella comprising a pole having upper and lower ends. An openable canopy is attached to the pole, and a conduit is within the pole. The conduit has upper and lower ends. A plurality of support ribs extend from the pole to support the canopy. The support ribs comprise stiffenable tubes in communication with the conduit, the conduit and stiffenable tubes comprising a conduit system. A supply of cluster solids is in the conduit system. The cluster solids may comprise beads or small fragments of solid material, such as multifaceted fragments. Means for changing the pressure in the conduit system is provided. The pressure changing means is on said pole and in communication with the conduit. The stiffenable tubes are capable of stiffening with a decrease in pressure in the conduit system to open the canopy.

In a third embodiment, the present invention provides a canopy with any means of changing the pressure or other physical condition in the system but extending from a support structure other than a central pole. Such a canopy could extend from a supporting wall, or between supporting surfaces.

In any of the above-described embodiments, or in other embodiments as well, the stiffenable conduits may be used in combination with support rods or struts, the conduits and rods together forming support ribs. The rods may be pre-shaped or pre-formed into a desired shape.

BRIEF DESCRIPTION OF THE DRAWINGS

FIG. 1 is a side view of an embodiment of a closed umbrella of the present invention.

FIG. 2 is a side view of an embodiment of an open umbrella of the present invention.

FIG. 3 is an enlarged partial side view of the closed umbrella, with parts removed and broken away for clarity of illustration.

FIG. 4 is an enlarged partial cross sectional side view of the open umbrella of FIG. 3.

FIG. 5 is an enlarged partial side view of the open umbrella of FIG. 2, with parts removed and broken away for clarity of illustration.

FIG. 6A is an enlarged cross section taken along line 6A—6A of FIG. 3.

FIG. 6 is an enlarged cross section taken along line 6—6 of FIG. 4.

FIG. 7 is a side view of a closed umbrella of another embodiment of the present invention.

FIG. 8 is a side view of an open umbrella of the embodiment shown in FIG. 7.

FIG. 9 is an enlarged partial side view of the closed umbrella of FIG. 7, with parts removed and broken away for clarity of illustration.

FIG. 10 is an enlarged partial cross sectional side view of the open umbrella of FIG. 9.

FIG. 11 is an enlarged partial side view of the open umbrella of FIG. 8, with parts removed and broken away for clarity of illustration.

FIG. 12A is an enlarged cross section taken along line 12A—12A of FIG. 9.

FIG. 12 is an enlarged cross section taken along line 12—12 of FIG. 10.

FIG. 13A is a cross-sectional view of one alternative supporting rib of the present invention.

FIG. 13B is a cross-sectional view of another alternative supporting rib of the present invention.

FIG. 13C is a cross-sectional view of another alternative supporting rib of the present invention.

FIG. 13D is a cross-sectional view of another alternative supporting rib of the present invention.

FIG. 14 is a partial perspective view of another alternative embodiment of the present invention, showing use of the canopy of the present invention on an automobile.

FIG. 15 is a partial perspective view of the alternative embodiment of FIG. 14, showing the canopy opened to protect an one entering or exiting the automobile.

DETAILED DESCRIPTION

Embodiments of the present invention are illustrated in the accompanying FIGS. 1–15. In the first embodiment, illustrated in FIGS. 1–6A, there is an umbrella or supported canopy structure 10 having a canopy 12 and a support structure 14 which in the first embodiment comprises a center pole. The canopy 12 is openable to an expanded or open position, as shown in FIG. 2, and may be closed to a collapsed or closed position, as shown in FIG. 1, for carrying or storing when not in use.

For an umbrella, the openable canopy 12 may be made of any suitable waterproof covering and formed or sewn into any of the standard shapes for umbrellas, as will be understood by those of skill in the art. Alternatively, the openable canopy 12 may be a sunscreen material, for use as a parasol. Alternative shapes and styles for the covering may be designed to be used with the supporting structure described below, and alternative materials may be chosen for the openable canopy.

To move the openable canopy 12 between the open or expanded and the closed or collapsed positions, the first illustrated embodiment employs a conduit system 15 and means 16 for changing the pressure in the conduit system 15, the pressure changing means 16 being associated with the support structure or pole 14 and in fluid communication with the conduit system 15. In the first illustrated embodiment, the conduit system 15 comprises a central conduit 17 extending upwardly through the interior of the center pole 14 and a plurality of stiffenable tubes 18 extending radially outwardly from the central conduit 17, the conduit 17 and tubes 18 being in fluid communication with one another.

The first illustrated alternative embodiment uses a hydraulic system to open the canopy 12 of an umbrella 10. As illustrated in FIGS. 1 and 2, such a system may employ a hydraulic pump 20 or syringe that moves hydraulic fluid 22 or other liquid into and out of the conduit system 15, storing the fluid in a storage vessel 24 of the pump 20. In the first illustrated embodiment, the storage vessel 24 is in fluid communication with the lower end of the central conduit 17.

The hydraulic fluid 22 may be moved out of the storage vessel 24 and into the conduit system 15 by pushing upwards on a telescoping part or collar 28 of the pump 20, or the plunger of a syringe or other suitable structure for changing the pressure within the conduit system 15 may be used. The telescoping part or collar 28 is pulled to decrease the pressure in the conduit system and pushed to increase the pressure in the conduit system. The two parts 24, 28 of the pump 20 may be mounted at the bottom end of the center support pole 14 and may be coaxial with the pole. The pump parts may be designed to lock in either or both positions by, for example, turning the collar 28 to a locked position and then unlocking the collar 28 to change the pressure as desired. A handle 40 may be provided at the bottom end 41 of the pole 14 below the pump parts 24, 28, or the pump parts could be formed into a handle 40.

The conduit system 15 also includes a plurality of stiffenable tubes or members 18 having ends in fluid communication with the top end of the central conduit 17. The stiffenable tubes may be connected to the central conduit 17 through a manifold so that removing air from the central conduit 17 draws air from the stiffenable tubes 18 as well. The stiffenable tubes 18 hold a non-gaseous material, in the first embodiment, hydraulic fluid 22 which may flow between the central conduit 17 and the stiffenable tubes 18.

In the first embodiment, the pressure/hydraulic system is all liquid, which is noncompressible. Accordingly, the pump 20 mechanism must be powerful, but the distance traversed by the liquid is small, probably just enough to distend the walls of the tubes 18 a small amount.

In this first illustrated embodiment, it is desirable that the stiffenable conduits not be substantially expandable by the increased pressure, but that they stiffen into a rigid support matrix to open the canopy 12 and hold in the open position under the increased pressure with minimal change in size. The tubes may distend slightly under pressure increases, as shown in FIGS. 6 and 6A.

In FIGS. 3–5 in the first embodiment, as well as in FIGS. 9–11 in the second embodiment, only one stiffenable tube 18 is shown coming out from the central conduit 17 for clarity of illustration. It should be understood however, that a plurality of stiffenable tubes 18 extend radially out from the central conduit 17, spaced apart equally around the central pole, like spokes.

As discussed below, in other embodiments, the stiffenable tubes 18 may hold other non-gaseous materials, such as solid cluster fragments 50 in the second illustrated embodiment. In some other illustrated embodiments, as discussed below, it may be possible to use air to stiffen the stiffenable tubes 18.

In the second illustrated embodiment, shown in FIGS. 7–12A, the pressure changing means 16 comprises a manually-operated piston or pump 20 that serves to pump air out of the conduit system to create a partial vacuum to open the umbrella 10, to store the air while the umbrella is open, and to allow air to return into the conduit system to close the umbrella 10.

As shown in FIGS. 9 and 12A, when under normal pressure conditions, the stiffenable tubes 18 of the second embodiment have an inner diameter greater than the diameters of the cluster fragments or solids 50 held within them, and the tubes 18 are relaxed, as shown in FIG. 9. However, when the telescoping part or collar 28 of the pump 20 is pulled downward, drawing air out of the conduit system, outside air pressure causes the stiffenable tubes 18 to collapse around the cluster solids 50, until, as shown in FIGS. 10, 11 and 12, the cluster solids 50 are held in a compacted array or clustered, stiffening the tubes 18 into a rigid matrix to open the canopy 12 and hold it in the position shown in FIG. 8. Any suitable reversible locking mechanism can be placed on the pump 20 to hold it in the extended position shown in FIG. 8. When it is desired to close the umbrella canopy 12, the telescoping part 28 of the pump 20 may be released to release air held in a storage vessel 24 back into the conduit system 15, thereby allowing the stiffenable tubes 18 to expand again, thereby relaxing the tubes 18 and allowing the canopy 12 to close.

The cluster solids 50 of the second illustrated embodiment may be plastic spherical beads of the type that have been used in the past in hospitals as the filling in support pads sold under the trademark "VAC-PAC" and "OLYMPIC VAC PAC" by Olympic Medical of 5900 First Ave. S., Seattle, Wash. Alternatively, small multifaceted fragments may be used instead of spherical beads for the cluster solids 50 to allow for smaller conduits.

In the vacuum system of the second illustrated embodiment, the conduit system contains primarily loose solids and a small amount of gas (that is, air). But as gas volume is readily and easily enlarged in response to the negative pressure, or decrease in pressure, the distance to be traversed by the collar 28 along the shaft of the pole 14 to produce the desired vacuum should be expected to be considerably greater than the distance traveled by the collar 28 in the first embodiment.

A vacuum system such as that employed in the second illustrated embodiment could also employ another type of stiffenable tube 18 if desired, such as a bellows structure without cluster solids 50, the bellows structure shortening under a pressure decrease to open the canopy 12.

The stiffenable tubes or conduits 18 may be made out of a number of different materials, including any woven fabric formed with thread such as nylon, dacron, polyester, and the like with a rubberized matrix, in a preset form and impervious in order to allow the hydraulic pressure to be preserved, or in the case of the second illustrated embodiment, to allow the vacuum to be preserved. The stiffenable tubes or conduits 18 should form into the desired arc or whatever form has been selected when stiffened. It may also be desirable to use other materials, such as the materials used in penile implants that undergo hydraulic activation to form the lax implant element into a firm erection. Thus, it should be understood by those skilled in the art that many different materials may be employed, and as new materials are introduced to the marketplace, such materials may also be employed. The diameter of the stiffenable tubes 18 may vary, depending on whether they are used with the first or second illustrated embodiments, and depending on whether or not a support rod or strut is employed, as discussed below, along with the tube and the length of the rod if one is employed. A suitable diameter for the tubes 18 may be on the order of approximately 5 mm. It may be desirable to employ a thicker material at the joint or flex area 52, as shown in FIGS. 4 and 10.

The central conduit 17 may be made out of a number of different materials, such as different metals, as for example, stainless steel and aluminum and plastics such as polypropylene, or a metal or plastic tube with a rubberized lining to endure non-leakage. Such materials could also be used for all or a part of the stiffenable tubes 18 in the first illustrated embodiment. The central conduit 17 may have a diameter of about 5 mm for both of the illustrated embodiments of the invention.

It may also be desirable to use the supported canopy of the present invention, and either of the first two described systems, with a different type of support structure 14. Instead of a central pole 14, as in the traditional umbrellas shown in FIGS. 1–5 and 7–11, the canopy 12 could extend as a cantilevered surface from a support wall. The canopy 12 could also extend between surfaces, as shown in FIGS. 14 and 15, between an upper part 60 of an automobile door frame 62 and an upper part 64 of an automobile body frame 66, with the passenger or driver activating the canopy to stiffen the tubes 18 as desired, to provide protection while opening a portable canopy.

In the illustrated embodiments, support rods or struts 70 extend along the length of the stiffening tubes 18 so that together the support rods and stiffening tubes 18 comprise a plurality of support ribs 72 extending from the center pole 14 to further support the canopy 12 in the desired shape. The illustrated support rods may be concatenated to the conduits or tubes 18 in the canopy. The rods fall into a closed position when not supported by the activated conduits or tubes 18. Such a support rod system could also be used in other embodiments, such as one using air pressure to stiffen a system of stiffenable tubes 18. In any case, the use of such a system of support rods strengthens the canopy support and allows for use of smaller diameter stiffenable tubes or conduits 18. The combined strength of the support rods and stiffened tubes 18 may also provide greater strength for the umbrella to withstand the force of wind.

The support rods may be malleable and may be made or a metal such as, for example, stainless steel or may be made of a plastic material, such as nylon, delrin, torlon, and the like. The rods may have a circular cross-section, with a diameter of about 1 to 3 mm, or may be flat pieces, with dimensions of about 1 by 3 mm. However, it should be understood that these dimensions, shapes and materials, and others in this application, are given by way of example only, and that other dimensions, shapes and materials may be employed.

The rods may be preformed into a desired shape so that when the stiffenable tubes 18 are stiffened, the support rods help to define the shape of the opened structure. The support rods may also be used to establish unique or unusual forms for the canopy 12, such as, for example, one with a standard arc to a far point, where the conduit and rod would drop straight down to protect the user from lateral, wind-driven rain.

The combined support rods and stiffenable tubes 18 may be carried in sleeves (not shown) formed in the canopy 12, or may be secured together and to the canopy material by fabric or thread loops sewn to the canopy 12 and surrounding the rod-tube pair along their lengths, and may have end caps 73 that hold them together and to the canopy. The rods and tubes 18 may be on the same or opposite sides of the canopy 12.

The support rods or struts may have various shapes, such as circular, flat, oval or curved in cross-section, and may be on the same or on an opposite side of the canopy, as shown in FIGS. 13A, 13B, 13C and 13D. More than one rod or strut may be associated with each stiffening tube 18, as shown in FIG. 13C, where the tube is between a pair of rods. A non-circular rod may be employed along one side of an oblong tube 18, as shown in FIG. 13D. Other variations in the shapes, numbers and layout of the tubes 18 and rods or struts are possible and are within the scope of the invention. FIGS. 13A–13D illustrate some of the possible variations and combinations of tubes 18 and rods that may be employed.

It should be understood that it is not necessary that both the stiffenable tube 18 and support rod 70 be coextensive for the entire length of each rib 72. In some circumstances, it may be desirable to employ a short stiffenable tube 18 at the juncture with the center pole 14, to allow the joint 52 to be selectively stiffened and relaxed by changing the pressure in the stiffenable tube 18 at the joint 52. In such an embodiment, the illustrated systems of changing the pressure in the conduit system may be used, and stiffenable tubes 18 may be used on a shorter scale than that shown, with the support rods 70 extending across the span of the canopy 12. If desired, the support rods 70 may be connected to the center pole 14 or to a ring fastened on the center pole by a hinge connection, as in traditional umbrellas. However, it is not necessary that the support rods be connected to the center pole or other support structure 14.

In any of the illustrated embodiments, the malleable support rods 70 may be used in combination with the stiffenable tubes 18 to make up the supporting ribs 72 of the canopy 12, and they may be combined with end caps, held in sleeves or otherwise held to each other and to the fabric of the canopy 12. And as in the first embodiment, if both support rods and stiffenable tubes 18 are used, it is not necessary that they be coextensive; the stiffenable tubes 18 may be used to make a stiffenable joint 52 at the juncture of the ribs 72 and the center pole 14 or other support structure 14, to raise the rods to open and support the canopy 12.

In both of the above embodiments, the support ribs may comprise the stiffenable tubes 18 alone, without any additional support or strength from additional rods 70, or the rods may be shorter or longer than the tubes 18, of the two may be coextensive.

In some instances it may be desirable to combine a motor with either of the embodiments for motorized operation of the pump 20 or syringe. In some instances it may be desirable to use a replaceable compressed air container, such as an aerosol container, as the activating source for either system, to drive the pump or syringe or vacuum, or to fill a conduit system with air.

In addition, as an alternative to the stiffenable tubes 18 described with respect to the two illustrated embodiments, it may be desirable to use a plurality of stiffenable members as the support ribs 72 that are made of so-called "smart materials," that is, materials that reversibly stiffen under predetermined conditions, such as when exposed to an electric field. Liquid materials of such a type may be carried in tubes 18, as shown in the illustrated embodiment, with a device that generates the physical condition that causes stiffening carried on the center pole 14 or by the person using the umbrella. Examples may include electrorheological fluids comprising fine polarizable particles or particles that acquire a positive charge at one end and a negative charge at the other end suspended in a nonelectrically conductive liquid, that polarize and form chains when exposed to an electric field to stiffen and that return to the liquid state when the electric field is removed. Examples of such materials may include cornstarch in corn oil, silica gel in mineral oil, cellulose in transformer oil and zeolite in silicone oil. Other materials such as synthetic polypeptides have been developed that expand and contract in response to temperature or chemical changes in its environment. Such materials could be used, as well as other alloys and polymers that exhibit shape memory, that will stiffen and relax to predetermined shapes under controllable sets of conditions, with such conditions being selectively generated by a device provided at or on the center pole 14 or handle 40 of the umbrella. In such cases, a means for changing physical conditions to which the stiffenable members 18 are exposed would be supplied, which could comprise means for changing the pressure in the tubes 18 as described herein, or a means for changing a condition such as the electric field, temperature, and the like.

Thus, as used herein, "stiffen" and "stiffenable" generally refer to a change in position of the tubes 18, changing from the unstiffened or relaxed closed position, where the tubes 18 or canopy 12 hang flexibly from the support pole 14 or structure, to the stiffened open position where the tubes 18 and canopy 12 extend outwardly from the pole or support structure 14. When stiffened, an angle between at least part of the tube 18 and the support structure or pole 14 increases from one angle in the closed position to the greater angle defined by the open position, such as shown in FIGS. 3 and 5 and 9 and 11.

Moreover, a stiffenable tube 18 is one in which the angular relationship between adjacent segments of the tube 18 may be variable, such as at the joint 52. The ease with which that angular relationship may be changed is also variable, and when the stiffenable tube 18 is stiff, the force required to change the angular relationship is greater than when the tube 18 is not stiff. Moreover, the degree to which a stiffenable tube 18 may be bent over upon itself changes, and when stiff, the force required to bend the stiffenable tube 18 over upon itself is greater than when the tube 18 is not stiff. These conditions may be met along the entire length of the stiffenable tube 18 or merely at one point along the length, such as at the joint 52 between the stiffenable tube 18 and the central conduit 17.

Thus, in some instances, a stiffenable tube 18 is one in which the angular relationship between a length of the tube 18 and some reference, such as the center support pole, support structure 14, or adjacent segment of the tube 18, can be changed from a smaller to a larger angle as the canopy 12 is opened. And in some instances, a stiffenable tube 18 is one in which the force required to change this angular or positional relationship is greater at the open position than at the closed position. A stiff tube 18 is one that defines an angle or position with a reference, such as the center support pole or other support structure 14 or other segment of the tube 18, that either is a larger angle than the angle defined when the tube 18 is not stiff or that requires more force to change compared to the force required to change the angular or positional relationship at the closed position.

Stiffening of the tubes 18 may be accomplished by distending the tubes or constricting or shortening them, for example. The manner in which stiffening is accomplished will vary with the materials used. Other changes in the tubes and in the material held within the tubes, such as those changes that would be undergone by the smart materials described above, are within the meaning of stiffen and stiffening.

While the present invention has been described in terms of illustrated embodiments, many of the innovative features of the invention disclosed could be utilized apart from the totality of features disclosed and hence would still fall within the spirit and scope of this invention. Therefore, although certain alternative and modified approaches or aspects have been disclosed herein, it also should be understood that various modifications, changes and variations may be made in the arrangement, operation and details of construction of the elements disclosed herein without departing from the spirit and scope of this invention.

I claim:

1. In a canopy structure of the type having a support structure and an openable canopy extending a canopy operator comprising:
   a conduit system including a plurality of stiffenable tubes extending along the portion of the openable canopy to be supported, the conduit system further including a storage vessel and a central conduit in the support structure connecting the storage vessel to the stiffenable tubes;
   a supply of liquid in the storage vessel; and
   means for changing the pressure in the conduit system by moving the liquid between the storage vessel and the stiffenable tubes to cause said stiffenable tubes to stiffen and relax said pressure changing means being on said support structure and in communication with the conduit system.

2. In a canopy structure of the type having a support structure and an openable canopy extending from the support structure, a canopy operator comprising:
   a conduit system including a plurality of stiffenable tubes extending along the portion of the openable canopy to be supported;
   a supply of cluster solids in the stiffenable tubes; and
   means for changing the pressure in the conduit system to cause said stiffenable tubes to stiffen and relax, said pressure changing means being on said support structure and in communication with the conduit.

3. The canopy operator of claim 2 wherein said stiffenable tubes are collapsible around said cluster solids.

4. The canopy operator of claim 3 wherein said pressure changing means comprises a piston for moving air into and out of the conduit system to stiffen said stiffenable tubes by drawing air out of said conduit system so that said stiffenable tubes collapse around said cluster solids.

5. The canopy operator of claim 1 wherein said stiffenable tubes are collapsible to a predetermined shape as pressure decreases in the conduit system.

6. The canopy operator of claim 1 wherein said conduit system includes joints at the junctures of the stiffenable tubes and the central conduit, said joints having different degrees of stiffness under different pressures in the conduit system.

7. The canopy operator of claim 1 wherein said stiffenable tubes are stiffenable to a predetermined shape as pressure increases in the conduit system.

8. The canopy operator of claim 1 further comprising a support rod extending alongside a stiffenable tube.

9. The canopy operator of claim 8 wherein the support rod extends alongside the stiffenable tube to the end of the stiffenable tube.

10. The canopy operator of claim 1 wherein said stiffenable tubes are substantially non-expandable.

11. The canopy operator of claim 1 wherein said support structure comprises a pole and wherein said central conduit is within said pole.

12. The canopy operator of claim 1 wherein said support structure comprises a wall and wherein said central conduit is within said wall.

13. A supported canopy structure comprising:

a support structure;

an openable canopy attached to the support structure;

a conduit system associated with said openable canopy to support the openable canopy, the conduit system including a plurality of stiffenable tubes extending along the openable canopy;

a supply of hydraulic fluid in the conduit system; and means for changing the pressure in the conduit system, said pressure changing means being on said support structure and in fluid communication with the conduit system, said pressure changing means including a hydraulic piston on the support structure;

wherein the stiffenable tubes stiffen with an increase in pressure in the conduit system to open the openable canopy.

14. The supported canopy structure of claim 13 further comprising a rod extending alongside a stiffenable tube.

15. The supported canopy structure of claim 13 wherein said support structure comprises a central pole.

16. The supported canopy structure of claim 15 wherein said conduit system includes a central conduit within said central pole and in fluid communication with said stiffenable tubes and with said means for changing the pressure in the conduit system.

17. A supported canopy structure comprising:

a support structure;

an openable canopy attached to the support structure;

a conduit system associated with said canopy to support said canopy, the conduit system comprising a plurality of stiffenable tubes extending along the openable canopy;

a supply of cluster solids in the conduit system; and means for changing the pressure in the conduit system, said pressure changing means being on said support structure and in communication with the conduit system;

wherein the stiffenable tubes stiffen with a decrease in pressure in the conduit system to open the openable canopy.

18. The supported canopy structure of claim 17 further comprising a rod extending alongside a stiffenable tube.

19. The supported canopy structure of claim 17 wherein said stiffenable tubes are collapsible around said cluster solids with a decrease in pressure.

20. The supported canopy structure of claim 17 wherein said support structure comprises a pole.

21. The supported canopy structure of claim 17 wherein said support structure comprises a central pole, said conduit system further including a central conduit within said central pole and in communication with said stiffenable tubes and with said means for changing the pressure in the conduit system.

22. A supported canopy structure comprising:

a support structure;

an openable canopy attached to the support structure;

a plurality of stiffenable tubes extending along the openable canopy;

a supply of electrorheological fluid in the tubes; and means for changing an electrical field through each of the tubes to selectively change the stiffness of the stiffenable tubes.

23. The supported canopy structure of claim 22 further comprising a plurality of support rods extending along the stiffenable tubes to support the canopy.

24. A supported canopy structure comprising:

an openable canopy;

a plurality of stiffenable members extending along portions of the openable canopy, the stiffenable members exhibiting different stiffnesses under different physical conditions;

at least one support rod extending alongside at least one of the stiffenable members;

means for changing the physical conditions to which the stiffenable members are exposed to selectively change the stiffness of the stiffenable members.

25. The supported canopy structure of claim 24 further comprising a stiff pole extending through the center of the openable canopy.

26. The supported canopy structure of claim 25 wherein the stiff pole includes a conduit and wherein the stiffenable members comprise hollow tubes in communication with the pole conduit.

27. The supported canopy structure of claim 24 further comprising a support structure to which the openable canopy is attached.

28. The supported canopy structure of claim 24 wherein the openable canopy has a pair of edges, the canopy structure further comprising a support structure to which the edges of the canopy are attached.

* * * * *